Sept. 30, 1969   J. G. CHUBBUCK   3,470,432
TRANSDUCER, TRANSDUCER SYSTEM AND TRANSDUCER SUSPENSION SPRING
Filed July 21, 1967   2 Sheets-Sheet 1

John G. Chubbuck
INVENTOR

BY  J. O. Tresansky
ATTORNEY

United States Patent Office 3,470,432
Patented Sept. 30, 1969

3,470,432
TRANSDUCER, TRANSDUCER SYSTEM AND TRANSDUCER SUSPENSION SPRING
John G. Chubbuck, Silver Spring, Md., assignor, by mesne assignments, to the United States of America as represented by the Secretary of the Navy
Filed July 21, 1967, Ser. No. 655,244
Int. Cl. H02k 33/02, 35/02
U.S. Cl. 318—127                    8 Claims

ABSTRACT OF THE DISCLOSURE

A transducer apparatus system having a movable probe constrained to travel longitudinally by a single spoke suspension spring, a capacitance pickoff to sense probe motion, and an electronic control circuit which closely controls probe motion or force and provides voltage readouts indicative of probe displacement and probe force.

BACKGROUND OF THE INVENTION

The invention relates generally to transducers and more particularly to a controllable probe for tactile stimulation, a controllable probe in combination with a control system therefore, and a suspension spring for the controllable probe.

Typically, the study of the tactile sensory nervous system involves the mechanical excitation of a small region of an animal's skin by indenting it with a probe while observing the response of some portion of the nervous system to that stimulus. Although this is not a new art, little has been done to develop suitable stimulation transducers. A popular approach has been to use a commercial vibration generator that was initially intended for vibration testing of watches. However, the amplitude and force domain in which the highly sensitive tactile sensory system needs to be driven is vastly different than that for which watches are normally vibrated. Some improvement in probe motion control has been realized by attaching a magnetic type displacement pickoff to the vibration generator so that it may be operated in a closed rather than open loop manner. At small displacement amplitudes this configuration characteristically displays an elastic hysteresis (referred to as an "oil can" effect) due to the armature suspension system in the vibration generator as well as force dead space due to sliding friction in the pickoff that has been attached as an afterthought.

SUMMARY OF THE INVENTION

Accordingly one object of this invention is to provide an improved probe for tactile stimulation.

Another object of this invention is to provide an improved tactile stimulation system.

Still another object of this invention is to provide an improved suspension spring.

A further object of the present invention is to provide tactile stimulation apparatus having an improved resolution of force and displacement.

Yet a further object is to provide tactile stimulation apparatus with control of probe force.

Another still further object is to provide tactile stimulation apparatus with control of probe displacement.

Still another further object of the instant invention is to provide tactile stimulation apparatus with a readout of both probe force and displacement.

Yet an additional object is to provide a transducer having an improved pickoff.

Briefly, in accordance with one embodiment of this invention, these and other objects are attained by providing in a tactile stimulation system the combination of a transducer having a probe and a closed electrical loop having synthetic damping around the transducer in a displacement control mode of operation. An input electrical waveform to the system produces a corresponding displacement of the transducer probe. A second electrical loop is closed around the first system when operation in a force control mode is chosen. In the latter mode the input command waveform controls the probe force.

A more complete appreciation of the invention and many of the attendant advantages thereof will be readily appreciated as the same becomes better understood by reference to the following detailed description when considered in connection with the accompanying drawing.

Figure 1:
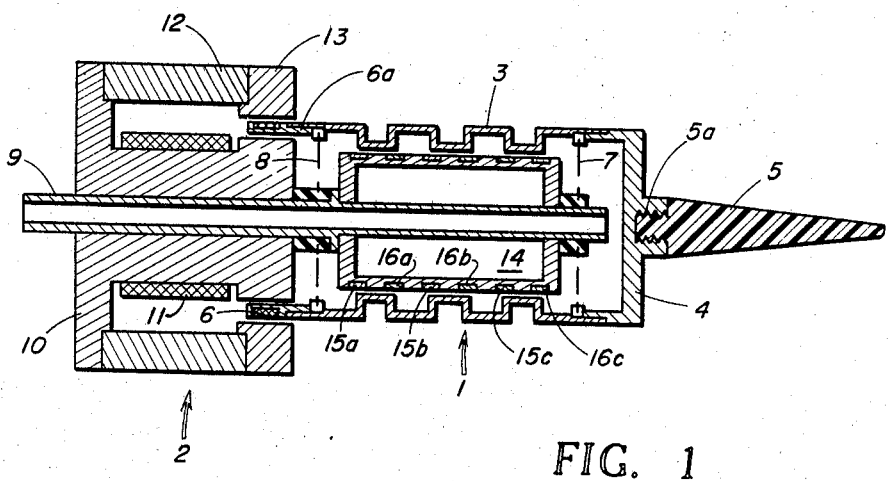
FIG. 1 is a cut-away view showing the general structure of the transducer assembly.
Figure 3:
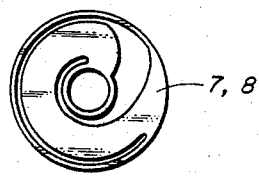
FIG. 3 is a plan view showing the general configuration of the front and rear suspension springs used in the transducer assembly.

Referring now to the drawing wherein like reference characters designate identical or corresponding parts throughout the several views, and more particularly to FIG. 1 thereof wherein an embodiment of the transducer assembly is shown consisting essentially of a movable probe assembly 1 suspended from a loudspeaker-type force producing assembly 2 which is rigidly attachable to a fixed support (not shown). The probe assembly includes a cylindrical sleeve 3 having three inwardly directed parallel circular ridges formed along a central portion of its length. An end cap 4 having a probe 5 is attached to the end of the sleeve as by threaded engagement at 5a. The sleeve and end cap may be formed of an electrically conductive material such as aluminum and the probe may be a non-conductor such as Plexiglas so as to provide electrical insulation from the specimen under test. Plexiglas is highly suitable as a probe material because it is easily machined and has a low mass. A circular ring 6a is fitted at the other end of the sleeve and a coil 6 is wound on a depression in the ring. Coil 6 is a loudspeaker-type force coil and is functionally a part of the force producing assembly 2. Front and rear springs 7 and 8, respectively, suspend the probe assembly from a hollow central shaft 9. The springs are press fitted into position by end cap 5 and ring 6a and may be secured by soldering.

The springs are, by way of example, photoetched from 0.005 inch thick beryllium copper sheet stock so as to form one wide spoke that wraps around the annular space between the shaft 9 and the sleeve 3. Beryllium copper is suitable because of the photoetching process and because of its low elastic hysteresis. The spoke may be thought of as a cantilever beam fixed at both ends that bends to allow a sleeve displacement. The central shaft passes through an aperture-formed centrally in a T-shaped cylindrical inner pole piece 10 of the force producing assembly. A coil 11 is wound about the central portion of the T-shaped inner pole piece. Coil 11 functions as a loudspeaker-type compensation coil. A high energy product ring-shaped permanent magnet 12 made from Alnico V, for example, is attached to the outer part of the inner pole piece. A ring-shaped outer pole piece 13 is attached to one extremity of the permanent magnet 12 in spaced relationship with inner pole piece 10, thereby providing an air gap between the inner and outer pole pieces in which the force coil 6 is suspended. (Both the inner and outer pole pieces may be formed of a material which saturates at a high level of flux density.)

An inner cylindrical sleeve 14 is mounted on the hollow shaft coaxially with outer sleeve 3 toward the forward portion of the transducer assembly. The cylinder may be formed of a non-conductive material such as Plexiglas. Six parallel metal rings 15a, 16a, 15b, 16b, 15c and 16c, which may be formed of brass, are embedded in the surface of the cylinder. Each ridge of outer sleeve 3 which is maintained at ground potential, spans between the midpoints of two adjacent rings on inner sleeve 14 when the former sleeve is in its center (no displacement) position. Outer sleeve and probe displacement is provided by an electronic control system which is more fully described hereinafter. The close spaced relationship between each of the six metal rings in inner sleeve 14 and the grounded outer sleeve 3 constitute six capacitors which vary as the outer sleeve is displaced. These capacitors form a part of a capacitance bridge described more fully in the discussion of FIGURES 2 and 4. Extreme radial rigidity of the spring suspension system allows close spacing between the rings and the outer sleeve thereby maximizing sensitivity of the displacement sensing system without danger of shorting.

Figure 2:
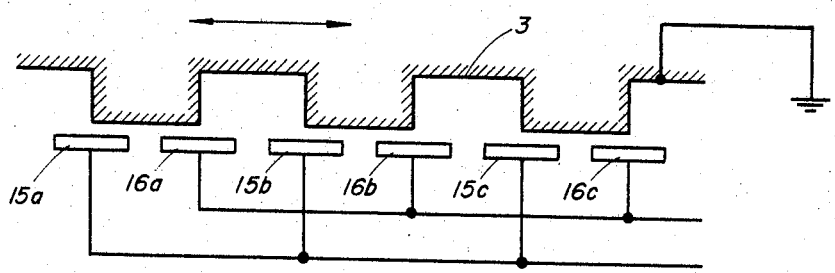
FIG. 2 is a partially schematic view showing the capacitance pickoff feature of the transducer assembly.

FIG. 2 shows a connection of the rings arranged so that axial displacement of the grounded outer sleeve to the left increases the capacitance between rings 15 and ground while decreasing the capacitance between rings 16 and ground. Displacement to the right achieves the reverse result. Thus sleeve displacement is sensed by capacitance variations. The rings are connected in three parallel sets to increase sensitivity of the system. This capacitor displacement sensing, or capacitor kickoff, arrangement does not add to the sleeve mass nor does it restrict the longitudinal movement of the outer sleeve. Radial movement is virtually eliminated by the high radial rigidity of the suspension springs.

Figure 4:
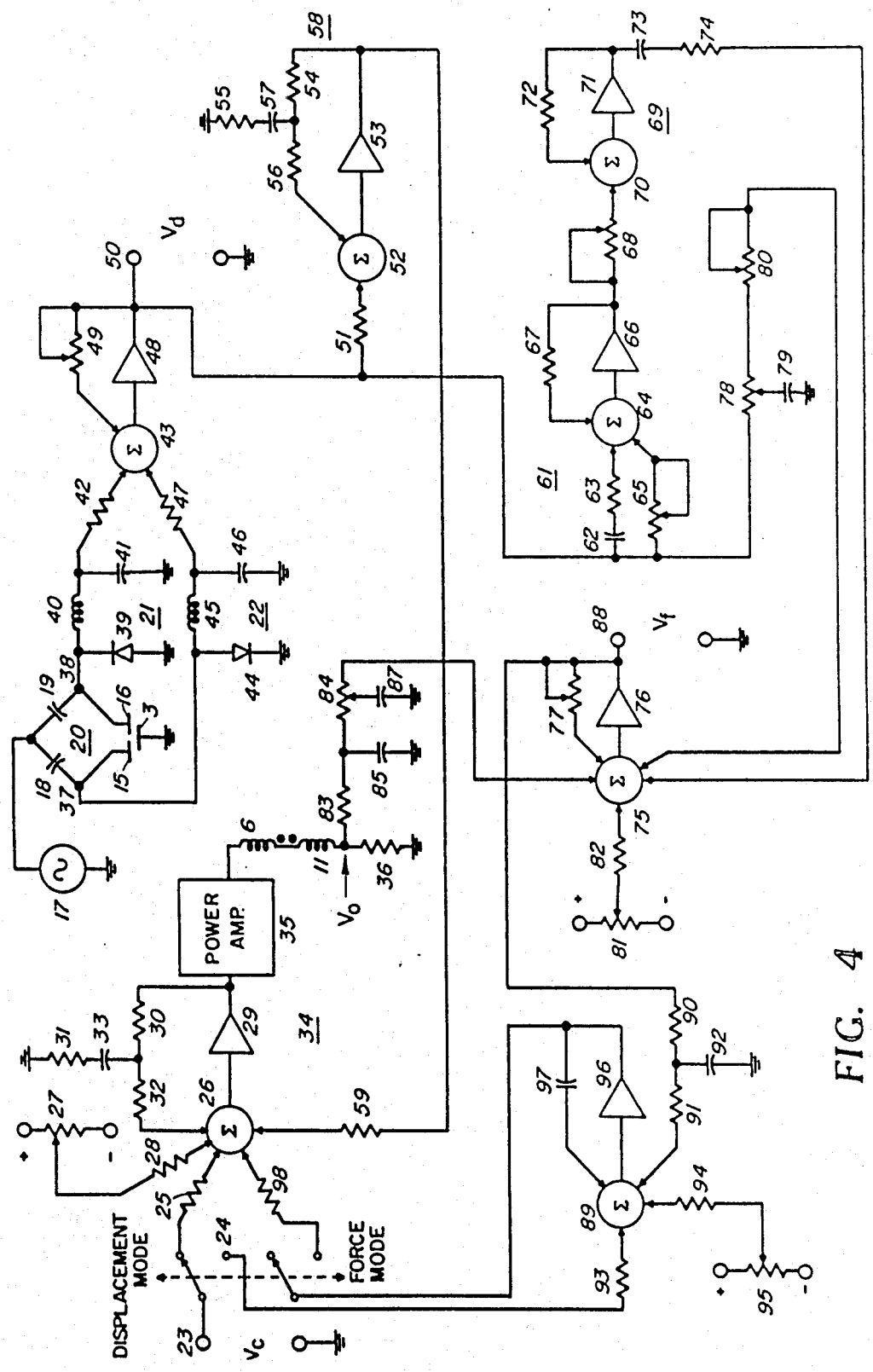
FIG. 4 is a schematic partially in block diagrammatic form of the circuitry of the stimulator system.

FIG. 4 shows a schematic circuit diagram of the electronic circuit which controls the outer sleeve and probe. Referring first to that portion of the circuit associated with the capacitor pickoff arrangement, a capacitance bridge 20 is formed by the fixed capacitors 18 and 19 and the rings 15 and 16 which function with grounded sleeve 3 to provide variable capacitors. The balanced bridge condition defines the "no displacement" position of the probe. The bridge is excited by oscillator 17 and the output from the bridge is connected to rectifier circuits 21 and 22. Oscillator 17, bridge 20, and rectifiers 21, 22 are physically located within sleeve 14. Leads (not shown) from the rectifier outputs are brought out of the transducer assembly through hollow shaft 9. Alternatively, the oscillator 17, fixed capacitors 18, 19 and the rectifiers 21, 22 may be external to the transducer if the interconnecting leads are well shielded. When the probe assembly is not displaced, bridge 20 will be in a balanced condition. The alternating voltage produced by oscillator 17 will cause equal voltages to appear at points 37 and 38 because capacitors 15 and 16 are equal, and capacitors 18 and 19 are also equal in that condition. Rectifier 21 consisting of diode 39, connected so as to clamp the negative extreme of the signal appearing at point 38 to ground, smoothing inductor 40, and filter capacitor 41, passes a positive and essential D.C. signal to scaling resistor 42 which is connected to summation node 43. Rectifier 22 consisting of diode 44, connected so as to clamp the positive extreme of the signal appearing at point 36 to ground, smoothing inductor 45, and filter capacitor 46, passes a negative and essentially D.C. signal to scaling resistor 47 which is connected to the summation node. When the probe is not displaced and the bridge is balanced, the rectifier outputs will be equal and of opposite polarity. When the probe is displaced to the left (see FIG. 2) capacitor 15 increases in value while capacitor 16 decreases in value, thereby causing bridge unbalance. The voltage will be greater at point 38 than at point 37 resulting in a larger positive output from rectifier 21 than from rectifier 22. Thus the differential voltage at the summation node 43 will be some positive voltage, depending on the degree of bridge unbalance (and probe displacement). In like manner, a probe displacement in the opposite direction will result in some negative differential voltage at the summation node 43. An operational amplifier 48 with a feedback loop having a potentiometer 49 connected to the summation node 43 to adjust the amplifier again, amplifies the differential voltage and provides a voltage output $V_d$, representative of probe displacement, at terminals 50. The overall circuit operation will be better understood if a general description is first made. In operation, the probe assembly displacement or its force (applied to a load, such as the skin of an animal specimen) may be controlled. A command voltage $V_c$ is applied at input terminals and provides dynamic control of probe displacement or probe force. A circuit selector, such as switch 24, selects either the displacement mode or force mode of operation. The voltage $V_c$ is typically a square wave, triangular wave, or sine wave, depending upon the operator's requirements and purposes. Static steady-state adjustments of displacement during operation in the displacement mode are made by varying potentiometer 27 to thereby apply a DC voltage to the system input along with the time-varying command voltage $V_c$. In a similar manner potentiometer 95 provides a static steady-state adjustment of force during operation in the force control mode. It is to be understood that during operation in the force mode the displacement potentiometer 27 is set for zero voltage and that for operation in the displacement mode the force potentiometer 95 is set for zero voltage. During operation in either mode, the voltage $V_d$ at terminals 50, representative of probe displacement and the voltage $V_f$ at terminals 88, representative of specimen reaction force, are always present and can be read-out for recording or observation by external equipment (not shown). The voltage $V_f$ is derived by a "force computer" circuit, described more fully hereinafter, which in effect solves a free-body equation for specimen reaction force.

In the displacement mode, an operational loop is formed which includes power amplifier 35 which drives series coils 6 and 11 of the transducer assembly. The transducer operates in the manner of a conventional loudspeaker type motor to exert a force on the probe assembly thereby causing the outer sleeve and probe to move. Coil 6, the force coil, and coil 11, the compensation coil, are connected in series opposition to linearize the relationship of coil current to force on the moving sleeve. The probe displacement voltage $V_d$ at terminals 50 is fed back through a differentiating network 58 to the system input for mixing with the dynamic and static input control voltages. Network 58 in the feedback loop and a second differentiating network 34, located in the forward part of the loop, provide synthetic damping to overcome the probe resonance and to provide a flat frequency response.

In the force mode of operation, a second loop is closed around the system and the specimen force reaction voltage $V_f$ at terminals 88 is fedback to the system input. Now considering the circuit with greater particularity, assume that switch 24 is in the displacement mode position, then the input voltage $V_c$ will be applied through a scaling resistor 25 to a summation node 26. A potentiometer 27 providing a probe steady-state position control, is connected between positive and negative supply voltages and its rider is connected to the summation node by a scaling resistor 28. The summation node output is fed to an operation amplifier 29 having a feedback loop to the summation node including resistors 30, 31, 32 and a capacitor 33. The operational amplifier and feedback loop constitute the forward loop differentiating network 34. The operational amplifier 29 is connected to a conventional power amplifier 35 to drive the force coil 6 and compensation coil 11 of the transducer. A resistor 36 between the compensation coil 11 and ground provides a means of sensing the coil current, $I_a$ (not shown), and provides a voltage, $V_o$, representative of that current. The voltage $V_o$ is applied to a force computer circuit described more fully hereinafter. The voltage $V_d$ is also applied through a scaling resistor 51 to summation node 52. The node output is connected to an operational amplifier 53 having a feedback loop to the summation node including resistors 54, 55 and 56 and capacitor 57. The operational amplifier and feedback loop constitutes the feedback loop differentiating network 58. The operational amplifier 53 output is fedback to summation node 26 through scaling resistor 59.

When switch 24 is in the force mode position, a second feedback loop is placed in the circuit. In this mode, probe force is the variable. The voltage $V_d$ from operational amplifier 48 is applied to differentiator network 61, consisting of capacitor 62 and resistor 63 in series to a summation node 64. $V_d$ is also applied to the summation node through potentiometer 65 to provide velocity compensation. An operational amplifier 66 connected to the output of the summation node, which has a feedback resistor 67 going to the summation node. The output of differentiator 61 is connected to a potentiometer 68 which provides acceleration compensation and which is connected to a mass scale factor compensating network 69 which includes a summation node 70 and an operational amplifier 71 with a feedback resistor 72 going to the summation node 70. The operational amplifier output is connected to capacitor 73 and resistor 74 in series to summation node 75. The output of the node is applied to operational amplifier 76 having a feedback loop consisting of potentiometer 77. The potentiometer rider is connected to the operational amplifier output to provide again control and calibration of force voltage output. The circuit from operational amplifier 69 through capacitor 73 in combination with operational amplifier 76 and its feedback loop constitutes a second differentiator.

The voltage $V_d$ is also applied to a potentiometer 78 connected to ground thereafter as capacitor 79. The resistor-capacitor combination provides an adjustment to compensate for the transducer suspension spring constant and also provides a high frequency roll-off which is explained in greater detail hereinafter. Potentiometer 78 is connected to a potentiometer 80 which is in turn connected to summation node 75. Potentiometer 80 provides spring compensation gain. Potentiometer 81 which compensates for gravity and other misalignments on the transducer is connected between sources of positive and negative voltage and the rider is connected by a scaling resistor 82 to the summation node. In addition, the voltage $V_o$ representative of transducer core current at the top of resistor 36 is fed to a series resistor 83 and potentiometer 84 which is connected to the summation node 75. A capacitor 85 is connected between the juncture of resistors 83 and 84. Resistor 83 and capacitor 85 provide high frequency roll-off which will be explained further hereinafter. Capacitor 87 is connected between the rider of potentiometer 84 and ground. Varying the potentiometer 84 provides phase compensation, in effect an adjustable high-frequency roll-off. The output of operational amplifier 76 provides a voltage $V_f$ across terminals 88 which is proportional to the transducer probe force. The voltage $V_f$ is applied to a summation node 89 through serially converted resistors 90 and 91 connected to ground at their junction through a capacitor 92. It should be noted that the voltage $V_f$ is available to be read out in either the displacement control or force control modes of operation. Resistor 90 and capacitor 92 compensate for specimen damping characteristics. The input voltage $V_c$ is also applied to the summation node 89 through scaling resistor 93 in the force controle mode of operation. In addition a probe force steady-state control voltage is applied to the summation node through a scaling resistor 94 from the tap of a potentiometer 95 which is connected between a negative voltage source and ground. The output of the summation node 89 is fed to operational amplifier 96 having a feedback loop with capacitor 97 going to the summation node. The operational amplifier 96 output is fed through scaling resistor 98 to summation node 26 to complete the force mode feedback loop.

In operation, the transducer is highly resonant at a particular frequency within its desired operating range, typically at about 13 cycles per second. To achieve flat response it is therefore necessary to critically damp the displacement control loop by synthetic damping. In order to accomplish the required result, two differentiating networks are introduced into the loop, one in the forward portion of the loop at 34 and one in the feedback portion of the loop at 58. Two non-overlapping networks are required to avoid excessive high frequency gain that a single network would require. When a control voltage waveform $V_c$ is applied at terminals 23, the voltage is modified by network 34, amplified by power amplifier 35 and applied to the force coil 6 and compensation coil 11 causing probe 5 to be longitudinally displaced in accordance with the control voltage. Potentiometer 27 provides a manual control of the probe steady-state displacement. As the probe moves in response to the control sensing voltage $V_c$ the capacitor circuit senses the probe motion and a probe displacement voltage is produced at terminals 50. This voltage is also fed back as explained above. In the displacement mode the skin dynamics of the animal specimen under test are "overpowered," that is, the probe force is on the order of ten or fifteen times the reaction force of the specimen and the specimen reaction may therefore be ignored with respect to displacement behavior. This propiety of the device may be referred to as a high load force stiffness.

In the force control mode an "outer" loop is connected around the displacement control loop. The same input signal $V_c$ is provided, but instead of controlling displacement, it controls force. Obviously the force control loop is open when it is not in contact with the specimen. A manual probe force steady-state control is provided by potentiometer 95. In both modes of operation, a voltage $V_f$ representing the probe force is available at terminals 88. The force is computed by sensing the displacement voltage $V_d$, which is also available for readout and the coil voltage $V_o$ and by performing operations on those voltages, which in effect, solve a free-body equation for the force.

The free-body equation for the movable probe assembly may be written:

(1) $\qquad f = F_t - [M\ddot{x} + F_d\dot{x} + K_d x] - Mg$ where
    $f$ = specimen reaction force
    $F_t$ = force produced by the transducer force producing assembly
    M = mass of the movable probe assembly
    $F_d$ = viscous damping coefficient
    $K_d$ = suspension spring constant
    $Mg$ = force of gravity Written in the Laplace domain, Equation 1 becomes (2) $\qquad f = F_t - [Ms^2 + F_d s + K_d]x - Mg$ Referring now to FIGURE 4, the voltage $V_d$ at point 50 is proportional to $x$. The first differentiator 61 provides the function $Ms$, potentiometer 68 adjusts the magnitude of M and the combination of capacitor 73 with operational amplifier 76 provides a second differentiation to provide $Ms^2$. The term $F_d$ is adjusted in magnitude by potentiometer 65 and is differentiated by the combination of capacitor 73 and operational amplifier 76 to produce $F_d s$. The $K_d$ term adjustment is provided by potentiometers 78 and 80. Note that this term is not differentiated but is amplified only by operational amplifier 76. The $F_t$ term is supplied by the voltage from potentiometer 84. Both the $F_t$ and $K_d$ voltages are "rolled-off" at high frequencies in order to match the differentiated terms which are rolled-off by the differentiating networks. The $M_g$ term is supplied by potentiometer 81. It is apparent that voltages representing all the terms of Equation 1 and 2 are applied to operational amplifier 76 and that the output at 88 is therefore the specimen reaction force.

To align the stimulator system, switch 24 is placed in the displacement mode position and input terminals 23 are shorted together thus grounding the input ($V_c=0$). Gravity balance control 81 is adjusted to provide zero force indication at terminals 88. The input is then driven at a relatively large amplitude but very low frequency such that the mass reaction force of the sleeve is negligible while the diaphragm spring compensation controls 78 and 80 are adjusted for best force measurement null over the range of travel. The system is next driven at small amplitude and high frequency where the predominate force component is the sleeve mass reaction, and the gain of the differentiation amplifier 71 is adjusted for best force null. Then with the transducer driven at its resonant frequency, the velocity compensation control 65 is adjusted for best force null. All adjustments are, of course, made with the probe free of any form of physical contact. The gravity balance portion of alignment must be repeated after a change in orientation of the stimulus axis.

The tactile stimulator system described has been found to have a bandwidth of 0–140 c.p.s. in the displacement mode with a resolution on the order of 1.0 micron and a displacement range of 0.1 in. In the force measurement mode the bandwidth is 0–30 c.p.s. with a force range of 0–40 grams. A resolution of 10 milligrams can be achieved in a vibration free environment. An accuracy of 0.4 gram was reached. It should be noted that resolution relates to the ability of the device to respond faithfully to an input command and accuracy refers to the ability to achieve an absolute displacement position. The capacitance sideoff described has been found to have a sensitivity of 200 volts per inch.

Obviously, numerous modifications and variations of the present invention are possible in the light of the above teachings. For example, the ridged sleeve 3 of the transducer may be replaced by a smooth cylindrical non-conductive material such as Plexiglas and the capacitors could be painted on with a conductive paint. Reduced mass of the device could thus be achieved. In addition, holes may be provided in end cap 4 of the transducer to reduce any possible "dash-pot" effect which might be present.

It will be apparent to one skilled in the art that the invention may be used otherwise than as specifically disclosed. For example, since the stimulator system may be operated as a pulling as well as pushing mechanism, a somewhat larger and more powerful model with a longer travel capability may be used as a "muscle puller." (The contraction activity of muscle tissue is sometimes studied by detaching a small muscle spindle at one end and connecting it to some type of transducer that will sense tension or contraction that results when the tissue is excited.) Input driving functions would be static commands of tension or stretch. In this case the device should be thought of more as a measuring instrument than as an excitation means. In the displacement mode the high load force stiffness characteristic would inhibit changes in length of the tissue while the force computer would indicate the tensile forces resulting from an attempt to contract. Conversely, the force control mode would allow observation of muscle contraction against a preassigned constant tensil stress. Also, a number of properties of the stimulator system suggest extending the technique to a multiplicity of axes (perhaps as many as five) to form a micromanipulation system. The principally significant features are high resolution motion control, large dynamic range of displacement control, sensing of fractional gram level reaction forces, and high load force stiffness. It is expected that the minute reactions forces would be greatly amplified and fed back to the manual control transmitter to restore the operator's sense of feel of the manipulative process. A further use of the system would be as a dynamic tonometer for measurement of the inter-ocular pressure of the eye. Present devices only provide static pressure indications and require a large force on the lens of the eye. The system described could reduce the force required by a factor of 10 to 100.

It is therefore to be understood that within the scope of the appended claims the invention may be practiced otherwise than as specifically described herein.

I claim:

1. A transducer assembly comprising
 a movable cylindrical sleeve,
 means secured to one end of the sleeve for effecting contact with a load having some force reaction,
 a fixedly mountable structure having a portion thereof projecting within said sleeve,
 means for suspending said sleeve about said projecting portion of said structure and including a suspension spring comprising a spiral sheet of flexible material having an outer end and an inner end lying in one plane when unflexed, said material having a high width to thickness ratio, said outer end being attached to said movable sleeve and said inner end attached to said projecting portion of said fixedly mountable structure,
 magnetic force responsive means for selectively effecting longitudinal movement of said sleeve, and
 reactance means on said sleeve and said projecting portion cooperatively acting for sensing movement of said sleeve relative to said fixedly mountable structure.

2. The transducer assembly of claim 1 wherein said magnetic force responsive means includes a coil suspended in the air gap of a loudspeaker type motor.

3. The transducer assembly of claim 1 wherein said reactance means includes a series of parallel conductive rings disposed on said projecting portion and circular corrugations formed on said sleeve.

4. A transducer system comprising in combination:
 a movable cylindrical sleeve,
 means secured to one end of said sleeve for effecting contact with a load having some force reaction,
 a fixedly mountable structure having a portion thereof projecting within said sleeve,
 means for suspending said sleeve about said projecting portion of said structure;
 magnetic force responsive means for selectively effecting longitudinal movement of said sleeve,
 reactance means on said sleeve and said projecting portion cooperatively acting for sensing movement of said sleeve relative to said fixedly mountable structure,
 means responsive to said reactance means for producing a signal proportional to the displacement of said sleeve,
 means for activating said magnetic force responsive means to effect displacement of said sleeve, and
 means for damping the natural resonance of said movable sleeve.

5. The transducer system according to claim 4 additionally characterized by
 means for producing a signal proportional to the load force reaction on said sleeve.

6. The transducer system of claim 4 wherein said means for damping includes an active differentiating network.

7. A transducer system comprising in combination:
 a movable cylindrical sleeve,
 means secured to one end of said sleeve for effecting contact with a load having some force reaction,
 a fixedly mountable structure having a portion thereof projecting within said sleeve,
 means for suspending said sleeve about said projecting portion of said structure;
 magnetic force responsive means for selectively effecting longitudinal movement of said sleeve, reactance means on said sleeve and said projecting portion cooperatively acting for sensing movement of said sleeve relative to said fixedly mountable structure, means responsive to said reactance means for producing a signal proportional to the displacement of said sleeve, means for activating said magnetic force responsive means to effect control of sleeve force, and means for producing a signal proportional to the load force reaction on said sleeve.

8. A transducer system comprising means for applying a signal to selectively control said transducer in a displacement mode or a force mode of operation, means for producing a signal proportional to the displacement of said transducer, means for producing a signal proportional to the load force exerted on said transducer, first feedback circuit means including said displacement signal for modifying the effect of said control signal, and second feedback circuit means including said load force signal for modifying the effect of said control signal when said transducer is in said force mode of operation.

References Cited

UNITED STATES PATENTS

| | | | |
|---|---|---|---|
| 2,800,796 | 7/1957 | Wescott et al. | |
| 2,742,035 | 4/1956 | Hancock et al. | 128—2 |
| 3,047,661 | 7/1962 | Winker | 179—1 |
| 2,968,952 | 1/1961 | Stalder | 318—20.635 |
| 3,206,652 | 9/1965 | Monroe | 310—27 XR |
| 2,895,094 | 7/1959 | Seiler | 310—15 XR |
| 3,308,653 | 3/1967 | Roth | 128—2 XR |
| 2,632,791 | 3/1953 | Side. | |
| 2,907,320 | 10/1959 | De Weese et al. | 128—2 |
| 3,040,223 | 6/1962 | Buhrendorf | 318—128 XR |
| 3,353,040 | 11/1967 | Abbott | 310—27 |

MILTON O. HIRSHFIELD, Primary Examiner

B. A. REYNOLDS, Assistant Examiner

U.S. Cl. X.R.

128—2; 310—15, 27; 318—18